United States Patent
Wu

(10) Patent No.: US 12,047,804 B2
(45) Date of Patent: Jul. 23, 2024

(54) METHOD OF CONTROLLING DATA TRANSMISSION AND DEVICE THEREOF

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 335 days.

(21) Appl. No.: 16/611,689

(22) PCT Filed: May 7, 2018

(86) PCT No.: PCT/CN2018/085841
§ 371 (c)(1),
(2) Date: Nov. 7, 2019

(87) PCT Pub. No.: WO2018/205900
PCT Pub. Date: Nov. 15, 2018

(65) Prior Publication Data
US 2021/0007003 A1     Jan. 7, 2021

(30) Foreign Application Priority Data

May 11, 2017   (CN) .......................... 201710331163.1

(51) Int. Cl.
  *H04W 28/02*   (2009.01)
  *H04W 72/0446*  (2023.01)
  *H04W 72/56*   (2023.01)

(52) U.S. Cl.
CPC ... *H04W 28/0257* (2013.01); *H04W 28/0268* (2013.01); *H04W 72/0446* (2013.01); *H04W 72/56* (2023.01)

(58) Field of Classification Search
CPC ......... H04W 28/0257; H04W 28/0268; H04W 72/0446; H04W 72/10; H04W 72/04;
(Continued)

(56) References Cited

U.S. PATENT DOCUMENTS

2012/0087247 A1* 4/2012 Min ................ H04W 36/00837
                                                      370/237
2013/0077486 A1* 3/2013 Keith .................. H04L 47/2433
                                                      370/230.1
(Continued)

FOREIGN PATENT DOCUMENTS

CN       102045853 A    5/2011
CN       102098653 A    6/2011
(Continued)

OTHER PUBLICATIONS

3GPP TS 38.300 v 0.2.0 (Year: 2017).*
(Continued)

*Primary Examiner* — Mandish K Randhawa
(74) *Attorney, Agent, or Firm* — Price Heneveld, LLP

(57) ABSTRACT

A method of controlling a data transmission and a device thereof are provided. According to the method, a data sender acquires QoS control information, and controls a data transmission according to QoS control information. In the case that the data sender is a UE, the network side device sends the QoS control information to the UE, so that the UE may control the data transmission according to the QoS control information and may perform the corresponding control onto the data transmission.

8 Claims, 1 Drawing Sheet

(58) Field of Classification Search
CPC ..... H04W 72/08; H04W 72/56; H04W 72/54; H04L 47/821
See application file for complete search history.

(56) References Cited

U.S. PATENT DOCUMENTS

| | | | | |
|---|---|---|---|---|
| 2013/0215742 | A1* | 8/2013 | Sirotkin | H04W 28/0247 370/230 |
| 2019/0053306 | A1* | 2/2019 | Cho | H04L 61/2503 |
| 2019/0261211 | A1* | 8/2019 | Wu | H04L 47/2441 |
| 2020/0022150 | A1* | 1/2020 | Yu | H04W 72/04 |
| 2020/0077315 | A1* | 3/2020 | Jin | H04W 76/10 |

FOREIGN PATENT DOCUMENTS

| | | |
|---|---|---|
| CN | 103442391 | 12/2013 |
| CN | 103442391 A | 12/2013 |
| CN | 104995951 A | 10/2015 |

OTHER PUBLICATIONS

3GPP, "Study on Architecture for Next Generation System", 3GPP TR23.799 V. 14.0.0, Dec. 16, 2016 (Dec. 16, 2016), p. 109, paragraphs 4-7, p. 114, paragraphs 3, 7 and 8, p. 116, paragraph 6 to p. 117, paragraph 7, p. 131, paragraph 6 and p. 136, last paragraph.

Orange, "Solution to Key Issue on QoS Framework", 3GPP TSG SA WG2 #113 AH S2-160939, Feb. 29, 2016 (Feb. 29, 2016), p. 4, paragraphs 1-22.

Qualcomm Incorporated, "TS23.501: New QoS Parameter for Calculation Windo Duration" 3GPP TSG SA WG2 #121 S2-173116, May 9, 2017 (May 9, 2017), p. 1, paragraph 7.

Qualcomm Incorporated, "Uplink UPCON Solution for Per Bearer/User Performance Differentiation", 3GPP TSG SA WG2 #103 S2-141838, May 13, 2014 (May 13, 2014), p. 6, paragraphs 1-16.

"Technical Specification Group Services and System Aspects; Study on Architecture for Next Generation System" 3GPP TR 23.799, V14.0, Dec. 2016.

EP Search Report in Application No. 18799176.5 dated Mar. 2, 2020.

CN Office Action in Application No. 201710331163.1 dated Jan. 20, 2020.

"Flow Level QoS Control", 3GPP TSG-RAN WG2 Meeting #97bis, Apr. 3, 2017.

"SR/BSR enhancements support of URLLC service in NR", 3GPP TSG-RAN WG2 #97bis, Apr. 3, 2017.

"Uplink UPCON solution for per bearer/user performance differentiation", SA WG2 Meeting #103, May 19, 2014.

"[23.501] QoS parameters and characteristics needed in 5G Systems", SA WG2 Meeting #119, Feb. 13, 2017.

"TS 23.501: Enforcement of Session AMBR", SA WG2 Meeting #120, Mar. 27, 2017.

"TS 23.501: New QoS parameter for calculation window duration", SA WG2 Meeting #121, May 15, 2017.

International Search Report and Written Opinion in Application No. PCT/CN2018/085841 dated Nov. 21, 2019.

"Solution to Key Issue on QoS Framework" SA WG2 Meeting #113 AH, Feb. 23, 2016.

European Office Action dated Oct. 13, 2021 as received in application No. 18799176.5.

"Uplink scheduling prioritization solution for FPI solution" SA WG2 Meeting #104. S2-142443. Jul. 7, 2014. Dublin, Ireland. Qualcomm Incorporated.

* cited by examiner

METHOD OF CONTROLLING DATA TRANSMISSION AND DEVICE THEREOF

CROSS REFERENCE OF RELATED APPLICATION

The present application is the U.S. national phase of PCT Application PCT/CN2018/085841 filed on May 7, 2018, which claims a priority of Chinese patent application No. 201710331163.1 filed on May 11, 2017, which is incorporated herein by reference in its entirety.

TECHNICAL FIELD

The present disclosure relates to the field of communication technologies, and in particular to a method of controlling a data transmission and a device thereof.

BACKGROUND

Fifth-generation (5G) wireless network is also known as the fifth-generation mobile phone mobile communication standard and it is an extension of 4G. 5G wireless networks can increase the transmission rate of signaling by using high carrier frequencies and unprecedented number of antennas. In addition, 5G can be combined with any potential new 5G air interface, LTE and WiFi, so as to provide universal high coverage and a seamless user experience.

In the 4G network, in order to ensure the transmission quality of the service data, the Quality of Service (QoS) of each service is generally ensured by controlling the scheduling of each Radio Bearer (RB). Specifically, in a 4G network, one RB is generally established on one logical channel. For the downlink situation, the network side can configure the priority of each logical channel, and allocate downlink resources according to the priority of the logical channel in the case of transmitting the downlink data, thereby ensuring that the data transmission of the RBs in each logical channel meets the QoS requirement (e.g., the data transmission rate). For the uplink, the network side can also configure each Logical Channel Prioritization (LCP), send the configuration result to the User Equipment (UE), and also send the uplink transmission grant (UL grant) to the UE. After receiving the UL grant, the UE side may allocate the uplink resource to each logical channel according to the priority of different logical channels configured on the network side, and indirectly control the RBs in each logical channel by scheduling the logical channel, thereby ensuring that the data transmission of RBs in each logical channel meets the QoS requirements.

In the 2G, 3G and 4G networks, the concept of data flow has not yet appeared. The 5G network introduces this concept, and generally one RB will contain multiple data flows for transmitting various data types (e.g., data flows for transmitting a video service, data flows for transmitting an audio service, etc.).

However, in the research of related technology, the applicants found that since different data flows also have different QoS requirements, the data transmission control methods in the related art are often not direct enough to meet the requirements. Therefore, there is a need to provide a new way to control the data transmission.

SUMMARY

The object of the present disclosure is to provide a new way of controlling the data transmission.

In a first aspect, a method of controlling a data transmission is provided in some embodiments of the present disclosure, including:
acquiring quality of service control information;
controlling a data transmission according to the quality of service control information, and/or transmitting the quality of service control information to a user equipment.

In a second aspect, a device of controlling a data transmission is provided in some embodiments of the present disclosure, including:
an acquiring unit, configured to acquire quality of service control information;
a processing unit, configured to control a data transmission according to the quality of service control information, and/or transmit the quality of service control information to a user equipment.

In a third aspect, a device of controlling a data transmission is provided in some embodiments of the present disclosure, including a processor, a memory and a network access program stored in the memory and executable by the processor, where the network access program is executed by the processor to perform the method of controlling a data transmission hereinabove.

In a fourth aspect, a computer-readable storage medium is provided in some embodiments of the present disclosure, where a network access program is stored in the computer-readable storage medium, the network access program is executed by the processor to perform the method of controlling a data transmission hereinabove.

According to the method of controlling a data transmission and the device thereof, in the method, a data sender acquires QoS control information, and controls a data transmission according to QoS control information. In the case that the data sender is specifically a UE, the network side device sends the QoS control information to the UE, so that the UE may control the data transmission according to the QoS control information, and may perform the corresponding control onto the data transmission. Compared with the prior art, the control process is more direct and simple, and may adapt better the future communication network environment.

BRIEF DESCRIPTION OF THE DRAWINGS

Various other advantages and benefits will become apparent to those skilled in the art from the following descriptions of embodiments, the drawings are only to illustrate the embodiments and are not to limit the present disclosure. In the drawings, the same reference numerals are used to refer to the same parts. In the drawings.

DETAILED DESCRIPTION

The technical solutions in the embodiments of the present disclosure are clearly and completely described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without creative efforts are within the scope of the present disclosure The terms "first", "second" and the like in the specification and claims of the present application are used to distinguish similar objects, and are not necessarily used to describe a particular order or order. It is to be understood that the data so used may be interchanged where appropriate, such that the embodiments of the present application described herein can be implemented, for example, in a sequence other than those illustrated or described herein. In addition, the terms "comprises", "comprising" and the deformations thereof are intended to cover a non-exclusive inclusion, for example, a process, method, system, product, or device that comprises a series of steps or units is not necessarily limited to Those steps or units may include other steps or units not explicitly listed or inherent to such processes, methods, products or devices. "and/or" means at least one of the connected objects.

Figure 1:
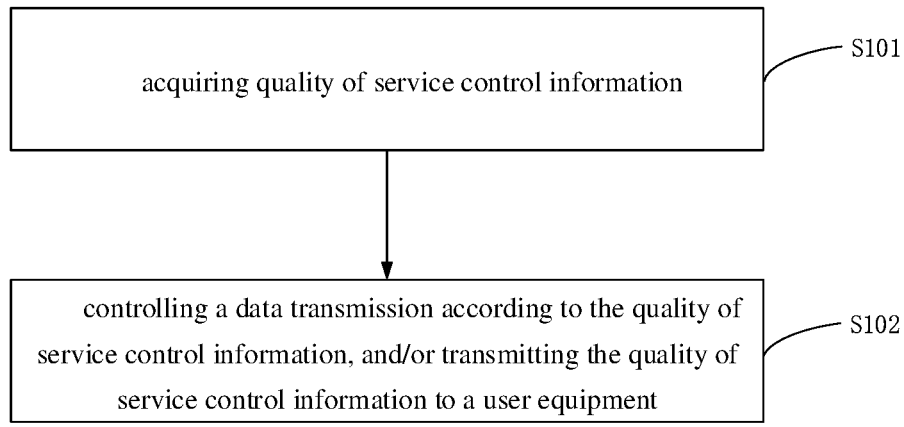
FIG. 1 is a flowchart of a method of controlling a data transmission in some embodiments of the present disclosure.

In a first aspect, a method of controlling a data transmission is provided in some embodiments of the present disclosure, as shown in FIG. 1, including:

S101: acquiring quality of service control information;

S102: controlling a data transmission according to the quality of service control information, and/or transmitting the quality of service control information to a user equipment.

According to the method of controlling a data transmission, a data sender acquires QoS control information, and controls a data transmission according to QoS control information. In the case that the data sender is specifically a UE, the network side device sends the QoS control information to the UE, so that the UE may control the data transmission according to the QoS control information, and may perform the corresponding control onto the data transmission. Compared with the prior art, the control process is more direct and simple, and may adapt better the future communication network environment.

In practical applications, the QoS control information herein is QoS control information that directly controls a certain type of data transmission. The data transmission herein may specifically include a transmission of a data flow, a transmission of a session, a transmission of radio bearer RB data and a transmission of terminal data. That is, the method provided in the above embodiment may directly perform a transmission control onto these specific data transmissions. Of course, at least one of the data transmissions may also be controlled at the same time, that is, the QoS control information may include at least one type of QoS control information.

In practical applications, there may be various types of execution entity of the above method embodiments.

(1) In the case that the execution entity is a network side device (for example, a base station) and downlink data is to be delivered, the network side device may generate QoS control information by itself or receive QoS control information from other network elements, and then perform a transmission control of downlink data transmission according to the QoS control information.

(2) In the case that the execution entity is also a network side device, the UE side needs to report data. At this time, the network side device also acquires the QoS control information, and sends the QoS control information to the UE after the acquiring the QoS control information.

(3) In the case that the execution entity is a UE, it is not difficult to understand that, in the case that the UE needs to report, the QoS control information sent by the network side device may be obtained by the UE, and then a transmission control of the uplink data may be performed according to the information.

That is, the above method embodiment may be applied to the transmission control of data uplink and data downlink of different entities.

In addition, it should be noted that the QoS control information herein may also be implemented in various ways. One type of QoS control information may be the control information itself, such as the data transmission rate and the like. The other type of QoS control information may be an identification information of the control information, that is, the network side and the UE side may agree in advance on the mapping relationship between the identifier information and control information. For example, the identifier information 001 indicates that the data transmission rate is 10M, the identification information 010 indicates that the window duration is 5 frames and so on. The purpose of this is, because some control information may occupy more bits, the manner of using such identification information may reduce the length of QoS control information transmitted by the network side and save air interface resources. Certainly, the QoS control information herein may also indicate the control information in other manners, which is not specifically limited in this embodiment of the present disclosure.

As described in the foregoing, the data transmission control method provided by the embodiment of the present disclosure covers various situations in which different execution entities perform data transmission control under different data transmission conditions. For the sake of clarity, the method provided by the embodiment of the present disclosure is explained from the network side and the UE side respectively for the case of the uplink data.

1. The execution entity is a network side device.

In the case that the execution entity is the network side device, and the network side device sends the control information to the UE to send the uplink data, the steps in the foregoing method embodiments may be specifically:

S101: acquiring quality of service control information;

S102: transmitting the quality of service control information to a user equipment.

It can be understood that, there may be many types of QoS control information sent by the network side in S101, and each type of QoS control information may indicate that the UE performs different types of data transmission control according to different QoS requirements, that is, S101 may be implemented differently according to different QoS requirements, and two optional implementations will be described in detail below.

(1) Data Filtering

In the method in some embodiments of the present disclosure, the control information in S101 may include a bit rate limiting parameter configured to limit a bit rate of the data transmission. Specifically, the limiting parameter herein may include any one or more of the following:

First type: a maximum flow bit rate or a guaranteed flow bit rate, and a flow identifier configured to identify the flow identifier of the limited data flow;

That is, this type of limiting parameter limits the bit rate of the data flow. In actual situations, different data flows may have different limiting parameters which depends on the type of service. The service type of some data flows determines that it needs to filter the data flow by the maximum flow bit rate, and some data flow service types determine that it needs to filter the data flow by the guaranteed flow bit rate. The two bit rate limiting parameters are separately described below.

The Maximum Flow Bit Rate (MFBR) is the maximum data bit rate of a transmission limited by a Guaranteed Bit Rate (GBR) type of QoS data flow. It can be known from the definition of the maximum flow bit rate that, the maximum flow bit rate is used to limit the transmission rate of the data flow. That is, by the limiting of the maximum flow bit rate, in the case that the rate of a certain data flow corresponding to the flow identifier exceeds the maximum flow bit rate, the data transmission of such data flow is stopped.

Guaranteed Flow Bit Rate (GFBR): a data bit rate expected to be transmitted by a Guaranteed Bit Rate (GBR) type of QoS data flow. It can be known from its definition that it is similar to the maximum flow bit rate, and the GFBR is also used to limit the data flow transmission rate. That is, by the limiting of the GFBR, in the case that the rate of the data flow of a certain service type corresponding to the flow identifier exceeds the guaranteed flow bit rate, the data transmission of such data flow is stopped.

Second type: a session aggregate maximum bit rate configured to identify the session identifier of the limited session;

Session Aggregate Maximum Bit Rate (Session AMBR) refers to is the maximum data bit rate of a transmission limited by all the non-GBR types of QoS flow in a specific data session (PDU Session, Packet Data Unit session). The purpose of the maximum bit rate of this session delivered by the network side is to limit the transmission rate of a session corresponding to the session identifier. In the case that the transmission rate exceeds the session aggregate maximum bit rate, the transmission of this session is stopped.

Third type: a terminal aggregate maximum bit rate configured to identify the terminal identifier of the limited terminal;

The UE aggregate maximum bit rate (UE-AMBR), which refers to the maximum data bit rate of a transmission limited by all the non-GBR types of QoS flow of a UE. In the case that the UE detects that the transmission rate of the terminal exceeds the terminal aggregate maximum bit rate, it stops transmitting data.

Fourth type: a radio bearer (RB) maximum bit rate configured to identify the RB identifier of the limited RB.

Similarly, in the case that the UE detects that the transmission rate of the RB exceeds the RB maximum bit rate, the transmission of the RB is stopped.

Certainly, the above-mentioned several bit rate limiting parameters are only a few embodiments of the present disclosure, and may also include other bit rate limiting parameters that may directly or indirectly control the data flow transmission, which is not specifically limited in some embodiments of the present disclosure.

It is not difficult to understand that the UE is incapable of controlling which type or types of data filtering mode is enabled. Therefore, the network side device needs to send to the UE an instruction of which type or types of data filtering is enabled. This instruction may be implemented in a variety of ways. For example, each data filtering corresponds to a command. If the network side sends the instruction, the UE starts the data filtering according to the instruction. Of course, these data rate filtering modes are not affected by each other. In order to save the air interface resources, the network side may directly send a bit rate limiting switch indication to the UE, and the bit rate limiting switch indicates whether the bit rate limit is enabled. Specifically, it may be further used to indicate whether the bit rate limit needs to be enabled for each of the limiting parameters included in the bit rate limiting parameter. Correspondingly, if the bit rate limiting switch indication received by the UE indicates that the bit rate limit is enabled, the bit rate of the data transmission is limited according to the corresponding limiting parameter indicated by the bit rate limiting switch indication.

For example, the bit rate limiting switch indication may the data of 5 bits, each bit is used to indicate whether a certain type of bit rate is enabled, for example, 1 for enabled and 0 for disabled. In the case that the bit rate limiting switch indication is 10001, it indicates that of the data filtering by the maximum flow bit rate is enabled, and the data filtering of the guaranteed flow bit rate is not enabled, the data filtering of the session aggregate maximum bit rate is not enabled, and the RB data filtering is not enabled, and the terminal aggregate maximum bit rate is enabled. Then, according to the indication, the UE performs a filtering on the data flow by the maximum flow bit rate and the terminal aggregate maximum bit rate.

It is not difficult to understand that, the UE may perform different ways of data filtering for different types of data transmission. For example, the UE may dynamically compare the current data transmission rate with the corresponding bit rate limit information, so that the data transmission may be dynamically adjusted. For such data filtering manner, the control information sent by the network side may further include time window information, and the time window information may be used to indicate a time window corresponding to the bit rate limiting parameter.

In the case that the bit rate limiting parameter includes the flow bit rate limiting parameter, the time window information includes first time window information configured to indicate a position of the time window corresponding to the flow rate limiting parameter.

In the case that the bit rate limiting parameter includes the session bit rate limiting parameter, the time window information includes second time window information configured to indicate a position of the time window corresponding to the session bit rate limiting parameter.

In the case that the bit rate limiting parameter includes the terminal bit rate limiting parameter, the time window information includes third time window information configured to indicate a position of the time window corresponding to the terminal bit rate limiting parameter.

In the case that the bit rate limiting parameter includes the radio bearer bit rate limiting parameter, the time window information includes fourth time window information configured to indicate a position of the time window corresponding to the radio bearer bit rate limiting parameter.

Certainly, in the case that the QoS control information includes various types of bit rate limiting parameters, the limiting parameters included in the bit rate limiting parameter may correspond to the same time window information. For example, the network side device may send the foregoing four types of bit rate limiting parameters, and at the same time, send a time window information, where the time window information is used to indicate the window corresponding to the four types of bit rate limiting parameter, that is, four types. The window corresponding to the four types of bit rate limiting parameter is the same, so that the window information may be avoided from being sent repeatly and the air interface resource may be saved.

Further, each time window information herein may specifically indicate the length of the corresponding time window. That is, the time window information may directly be the length of the time window of the bit rate of a certain type of data transmission, or may be the identification information mapped to the length of the time window.

For example, in the case that the control information includes time window information indicating the length of the time window, the data flow identifier and the data filtering of the maximum flow bit rate, each time the data flow is to be sent, the UE may dynamically determine a relationship between the maximum flow bit rate and the data flow bit rate within the length of the time window prior to the current time. If the data flow bit rate exceeds the maximum flow bit rate, the transmission of the data flow is stopped. The specific way how to calculate the data flow bit rate will be described in detail in the second part relating to the UE.

In addition, the UE may also adopt another method of data filtering. Specifically, the UE may periodically determine the relationship between the bit rate of the data transmission in the fixed time window and the corresponding bit rate limiting parameter, and this method is applicable to the case that uplink resource of the UE is fixed. Therefore, the time window information sent by the network side may also be used to indicate the time window position corresponding to each of the bit rate limiting parameters. The time window position is the time window position for calculating a type of bit rate corresponding to each type of the limiting parameters.

In the case that the time window information is configured to indicate the position of the time window, it may be implemented in various ways, such as issuing a time window starting position and a time window ending position; issuing a time window starting position and a time window length; issuing a time window ending position and a time window length; issuing a time window starting position, a time window ending position and a time window length. Therefore, the UE side may acquire the position of the fixed time window according to the received information. The way to calculate the position of the fixed time window will be described in detail in the UE section.

(2) Priority Management for Data Transmission for Data Transmission

The data filtering method in manner (1) may be used for different types of data transmission, thereby ensuring meeting the QoS requirements of each data type. Manner (2) is a specific transmission control method of data flows. The main purpose is that, by adjusting the priority of each data flow, each data flow may be allocated to a reasonable uplink resource according to the actual communication situation, so as to meet the QoS requirement.

Based on this, the QoS control information in S101 in the foregoing method embodiment may include a flow identifier, a priority of the data flow, a prioritised bit rate (PBR) of the data flow, and a bucket size duration (BSD).

Here, the prioritised bit rate PBR is used to indicate the amount of data that can be sent within a certain period of time. This variable actually reflects the maximum transmission capacity supported by a resource allocated for a certain data flow within a certain period of time. The product of the prioritised bit rate PBR and the data bucket size duration BSD is the maximum amount of data that the data bucket can transmit in the data bucket. The way of reasonably allocating of uplink resources by the UE through the priority, the prioritised bit rate PBR and the data bucket size duration BSD will be specifically described in the UE section below.

2. The Execution Entity is a UE

In the case that the execution entity is the UE, the network side device sends the control information, and the UE sends the uplink data, the steps in the foregoing method embodiments may be specifically:

S101: acquiring QoS control information;
S102: controlling a data transmission according to the QoS control information.

Here, the QoS control information here is specifically the QoS control information sent by the network side device.

As described above, the network side device in S101 may send various types of QoS control information based on different QoS requirements, and correspondingly, when the UE receives various types of QoS control information sent by the network side device, the UE may perform various implementations in performing the step of controlling the data transmission according to the QoS control information. The following two communication scenarios provided in the above are taken as an example to describe in detail different control actions performed correspondingly in the case that the UE receives different QoS control information.

(1) Data Filtering

As described in the foregoing, the QoS control information sent by the UE on the network side may include a bit rate limiting parameter configured to limit the transmission bit rate of the corresponding data transmission. Accordingly, an implementation manner of S102 is: in the case that a set type of bit rate reaches the bit rate limiting parameter corresponding to the bit rate within the preset time window, then controlling the corresponding data transmission to adjust this type of bit rate to a range limited by the bit rate limiting parameter.

As described in the foregoing, the data transmission may be the transmission of the data flow, the transmission of the session, the transmission of the RB and the transmission of the terminal data, which are respectively described below for each case.

(1) In the case that the bit rate limiting parameter is the maximum flow bit rate and/or the guaranteed flow bit rate and the data flow identifier, correspondingly, the UE controls the data transmission for the service type corresponding to different data flows further includes: for the data flow which may use the maximum flow bit rate, if the transmission bit rate of the data flow corresponding to the data flow identifier has reached the maximum flow bit rate within the preset time window, the transmission of this data flow is stopped, thereby reducing the bit rate of the data flow; if the transmission bit rate of the data flow corresponding to the data flow identifier has not reached the maximum flow bit rate, the transmission of the data flow may be continued.

For the guaranteed flow which may use the maximum flow bit rate limit, if the transmission bit rate of the guaranteed flow corresponding to the guaranteed flow identifier has reached the maximum flow bit rate within the preset time window, the transmission of this guaranteed flow is stopped, thereby reducing bit rate of the guaranteed flow; if the transmission bit rate of the guaranteed flow corresponding to the guaranteed flow identifier has not reached the maximum flow bit rate, the transmission of the guaranteed stream may be continued.

(2) In the case that the bit rate limiting parameter includes an RB maximum bit rate, and is used to identify the RB identifier of the limited RB, correspondingly, the control of the data transmission by the UE further includes: in the case that the transmission bit rate of the RB identified by the RB identifier reaches the RB maximum bit rate within a preset time window, the data transmission of the RB is stopped.

(3) In the case that the bit rate limiting parameter is the session aggregate maximum bit rate and the session identifier, the control of the data transmission by the UE further includes: in the case that the transmission bit rate of the session identified by the session identifier reaches the session aggregate maximum bit rate within the preset time window, the data transmission of the corresponding session is stopped.

(4) In the case that the bit rate limiting parameter is the terminal aggregate maximum bit rate, the control of the data transmission by the UE further includes: in the case that the transmission bit rate of the terminal identified by the terminal identifier reaches the terminal aggregate maximum bit rate within a preset time window, the data transmission of the terminal is stopped.

For example, how to obtain the transmission bit rate in the preset time window for each type of data transmission here is described below by taking the data flow as an example. The UE obtains the transmission bit rate of the data flow in the preset time window by using the following formula:

Data flow bit rate=amount of data transmitted by the data flow within the preset time window/preset time window duration.

The transmission bit rates of other types of data transmissions are also calculated according to a formula similar to the above formula, which will not be described herein.

The UE may obtain the preset time window duration by pre-negotiating with the network side device, or by receiving the time window information sent by the network side device, which is not specifically limited in this embodiment of the present disclosure.

Here, how does the UE know whether to enable the bit rate limit and which bit rate limit is enabled are determined based on the bit rate limiting switch indication sent by the network side device. The bit rate limiting switch indication indicates whether the bit rate limit is enabled. Specifically, it can be further used to indicate whether the bit rate limit needs to be enabled for each of the limiting parameters included in the bit rate limiting parameter. If the bit rate limiting switch indication received by the UE indicates that the bit rate limit is enabled, the bit rate of the data transmission is limited according to the limiting parameter indicated by the bit rate limiting switch indication.

In addition, the transmission bit rate in the preset time window obtained by each type of data transmission may be a transmission bit rate in a dynamic time window (corresponding to a data filtering mode in which the UE uses dynamic control for data transmission), or may be the transmission bit rate within the fixed time window (corresponding to the data filtering mode in which the UE uses periodic static control for data transmission). The two data filtering modes are described separately below.

(1) In the case that the UE adopts the dynamic control mode, the UE only needs to know the window duration every time when judging. Taking the data flow as an example, the UE may obtain the data flow bit rate within the preset window duration before the current judgment time each time the UE needs to make a judgment. If the first judgment is that the maximum flow bit rate is exceeded, the data flow is stopped; if not, the transmission status is continued. In the case that the second time needs to be determined, the UE obtains the data flow bit rate in the second determination time preset window duration, and obtains the control result of the second judgment time for the data flow. Each subsequent judgment is deduced so as to achieve dynamic judgment of data flow data transmission in such a manner.

It can be understood that the above-mentioned judging method actually sets the ending time position of the preset time window to the time position of acquiring the bit rate each time by default. In an actual application, the time position of the last data transmission may also be used as the ending time position of the time window, which is not specifically limited in this embodiment of the present disclosure.

(2) In the case that the UE adopts the static control mode, the UE needs to periodically determine the bit rate of the data flow transmitted in a fixed window, and then determine whether the data flow needs to be filtered in the period. In this case, the UE needs to know the specific position of the window. Of course, the specific position of the window may be negotiated in advance by the UE and the network side, or the time window information may be sent by the network side.

In the case that the time window information is required to be sent by the network side, the time window information may specifically include: an ending time position of the time window and a length of the time window. At this time, the UE may use the ending time position of the time window minus the length of the time window and an offset as the time window starting position. The offset here may be 1 or −1. In the case that the offset is 1, the starting position of the time window here is the ending time position of the time window minus the length of the time window and plus the offset. In the case that the offset is −1, the starting position of the time window here is the ending time position of the time window minus the length of the time window and minus the offset.

The time window information may also specifically include: a starting time position of the time window and a length of the time window. At this time, the UE may use the starting time position of the time window plus the length of the time window and an offset as the time window ending position. Again, the offset here may be ±1. In the case that the offset is 1, the time window ending position here is the starting time position of the time window plus the length of the time window and minus the offset. In the case that the offset is −1, the time window ending position here is the starting time position of the time window plus the length of the time window and the offset.

The time window information may further include: a starting time position of the time window and an ending time of the time window; at this time, the UE may directly acquire a position and a duration of the corresponding time window according to the starting time position of the time window and the ending time of the time window.

The time window information may also include only the starting time position of the time window or only the ending time of the time window, and the length of the time window is a length agreed by the UE and the network side device in advance. At this time, the UE may acquire the position of the corresponding window according to the starting position or the ending position and the pre-stored duration.

Of course, the time window information may also have other implementation manners. Correspondingly, the UE may also obtain the position of the time window in other manners, which is not specifically limited in this embodiment of the present disclosure.

In a specific implementation, in the case that the transmission data is a data flow, the UE may implement transmission control of the data flow in any one of several different protocol layers or in several protocol layers, where an optional implementation manner is: The Service Data Adaptation Protocol (SDAP) layer controls the transmission of data flows. That is, the data flow sent by the SDAP layer to the lower layer entity of the SDAP may be controlled. If the data filtering needs to be enabled, the data flow is filtered at the SDAP layer. The control operation is also not limited in this embodiment of the present disclosure.

(2) Priority Management for Data Flow for Data Transmission

As described in the foregoing, the management control of data flows may also be controlled based on the priority. Specifically, the control information sent by the UE to the network side may include a flow identifier of the data flow, a priority of the data flow, a prioritised bit rate PBR of the data flow and a data bucket size duration BSD. Correspondingly, the controlling the data transmission according to the QoS control information in S102 may specifically include:

S1021: allocating corresponding resources for each data flow, in an order from a data flow with a higher priority to a data flow with a lower priority, where for each data flow.

Specifically, the terminal maintains a data bucket value Bj for each data flow. The Bj value is "0" when the data flow is established, and Bj=PBR*duration, that is, the Bj may be continuously increased from 0 as the data flow is established. But in general, each Bj has a maximum value: Bj maximum value=prioritised bit rate PBR*bucket size duration BSD. That is, for each data flow, the amount of data that can be transmitted since the data flow is started to be established (i.e., Bj) needs to be less than or equal to the maximum data bucket value.

In the case that the Bj value corresponding to each data flow is greater than 0 the data in the first round of data transmission, and the resources are allocated to the corresponding data flows in an order from the data flow with a higher priority to the data flow with a lower priority, and then the Bj value may be updated by the following formula:

$$Bj(\text{new})=Bj(\text{old})-\text{the amount of data actually transmitted by this data flow in this round}+PBR*TTI \quad (1)$$

the TTI here is a transmission time interval, and since Bj=the prioritised bit rate PBR*duration, the PBR*TTI refers to the growth value of Bj in the duration corresponding to the data transmission in this round. It can be understood that the data flow may be a normal data volume during the transmission process, or there may be a case where a large amount of data is suddenly sent at a certain time point, so the result of Bj (new) updated according to the above formula may be greater than 0 (that is, the amount of data actually sent in the first round is normal, or may be less than 0 (that is, the amount of data actually sent in the first round exceeds the resources allocated to the data flow in this round).

At the beginning of the second round, it is necessary to first judge the Bj value of each data flow. The resources which can be allocated for each data flow need to satisfy the condition Bj>0. For the case where Bj is less than 0, the resource allocation may be performed until the next round. In this round, the data transmission cannot be performed. Therefore, in the second round, it is likely that only a part of the data flow may be eligible to be allocated with resources, and the data flow not allocated with resources may only be allocated with resources until its Bj value increases to more than 0 over time.

The subsequent each round of data flow resource allocation process is similar, and the actual amount of data transmitted in each round is K. Currently, the nth round of data transmission is performed, so the value of Bj(n) needs to be obtained. It can be known from the above formula (1):

$$Bj(n) = Bj(n-1) - Kn + PBR*TTI \quad (2)$$

$$Bj(n-1) = Bj(n-2) - Kn - 1 + PBR*TTI \quad (3)$$

...

$$Bj(2) = Bj(1) - K1 + PBR*TTI \quad (4)$$

Add the above formula to get $$Bj(n)=Bj(1)-(K1+K2+\ldots Kn)+(n-1)PBR*TTI \quad (5)$$

Since the initial Bj(1) is equal to 0, $$Bj(n)=-(K1+K2+\ldots Kn)+(n-1)PBR*TTI \quad (6)$$

In the nth round, it is necessary to judge whether Bj(n) is greater than 0, that is, compare sizes of (K1+K2+ . . . Kn) and (n-1) PBR*TTI, where K1+K2+ . . . Kn is the amount of data actually has been sent from the time point when the data flow is established to the current time point, and then (n-1) PBR*TTI is the data flow that can be sent according to the prioritised bit rate of the data flow from the time point when the data flow is established to the current time point.

Therefore, the above-mentioned allocating for each data flow resources corresponding to the prioritised bit rate of the data flow may be summarized as follows: for each data flow, if the amount of data that can be sent since the data flow is started to be established is smaller than the amount of data actually sent, the transmission of the data flow is stopped. The amount of data that can be sent refers to the amount of data that can be sent according to the prioritised bit rate of the data flow from a time point of starting to establish the data flow to a current time point.

Of course, there is a special case where the resources are allocated according to priorities of each data flow, namely: for the data flows with two adjacent priorities, in the case that the prioritised bit rate of the data flow with the higher priority is an unlimited bit rate, the resources may be allocated for the data flow with the lower priority after the resources allocated for the data flow with the higher priority are sufficient to transmit all margin data of the data flow with the higher priority.

For example, supposing there are three data flows, and the priorities of data flow 1, data flow 2 and data flow 3 are sequentially increased, where the prioritised bit rate of data flow 2 is an unlimited bit rate, that is, its PBR set is not limited. Then, in the case that the resources are actually allocated, first the data flow 3 is allocated with resources adapted to its prioritised bit rate according to the priority of the data flow 3, and then resources are allocated for the data flow 2. At this time, the UE may always allocate resources for the data flow 2 as long as there is data to be transmitted by the data flow 2, until there is no data in the data flow 2. After all data has been transmitted in data flow 2, the resources are finally allocated for the data flow 1.

S1022: in the case that there are still remained resources after all the data flows are allocated with the resources corresponding to the prioritised bit rates of the data flows, allocating the remained resources to the corresponding data flow in an order from the data flow with the higher priority to the data flow with the lower priority.

For example, supposing that there are three data flows, and their priorities are sequentially increased. In the case that resources are allocated, firstly the data flow 3 is allocated with resources, then data flow 2, and finally data flow 1. After the data flow 1 has been allocated with the resources, if there is still an UL grant remaining at this time, the remained resources are continuously allocated to the data flows in the order of the data flow 3, the data flow 2 and the data flow 1. Therefore, the transmission of the data flow is controlled based on the priority of the data flow in the above manner, so as to meet the QoS requirements of each data flow.

In a specific implementation, in step S102, the transmission of the data flow according to the priority of the data flow may be implemented in any one or more of the plurality of different protocol layers, where an optional manner is: controlling the transmission of data flows at the MAC layer. That is, the UL grant is allocated to the designated data flow at the MAC layer according to the above rules.

In addition, the management and control of each data flow according to the priority of the data flow may be controlling a plurality of data flows in the same RB according to the QoS control information of each data flow, thereby meeting the QoS requirements of the data flows in each RB.

3. The Execution Entity is the Network Side Device.

The content introduced above is the transmission control operation performed by the UE onto the data transmission after the UE receives the QoS control sent by the network side in the case of unlinking data. However, in the actual application, the method of enabling the data filtering for the data transmission mentioned above may also be applied to the case of downlinking data by the network side. The only difference is that the network side device does not need to issue the QoS control information at this time and may directly perform, according to the QoS control information, the data filtering on the corresponding data transmission in the same manner as how the UE controls the uplink data.

Therefore, in the case that the execution entity is a network side device and the downlink data is sent, the steps in the foregoing method embodiments may specifically be:

S101: acquiring quality of service control information;

S102: controlling a data transmission according to the QoS control information.

As described in the foregoing, the QoS control information may include a bit rate limiting parameter, and the bit rate limiting parameter may include a maximum flow bit rate and/or a guaranteed flow bit rate and a data flow identifier, which may include a session aggregate maximum bit rate and a session identifier, a RB maximum bit rate and a RB identifier, and a terminal aggregate maximum bit rate. Correspondingly, the method of controlling the data transmission according to QoS control information in step S101 may be:

S101': in the case that a set type of bit rate reaches a bit rate limiting parameter corresponding to the bit rate within a preset time window, controlling the corresponding data transmission to adjust this type of bit rate to a range of the bit rate limiting parameter.

The way how the network side device specifically obtains the transmission rate of a certain type of bit rate in a preset time window and how to perform the data filtering on the data transmission after comparing with the bit rate limiting parameter may refer to the data filtering on the data flow by the UE in the second part, and detailed description thereof is omitted herein.

Of course, the control information herein may also include a bit rate limiting switch indication that may be used to indicate whether a bit rate limit needs to be enabled for each type of bit rate. The network side device may perform corresponding data filtering on the data transmission according to the indication. The specific indication information and the corresponding processing manner also refer to the processing manner of the UE in the foregoing.

The control information herein may further include time window information for indicating a time window length corresponding to each type of bit rate limiting parameters, and the time window length is a length of a time window for calculating a type of bit rate corresponding to each type of the limiting parameters. The network side device may calculate the bit rate of each type of data transmission within the window duration according to the length of the time window, and further compare the bit rate with the corresponding bit rate limiting information, so to implement a dynamic control of the data transmission. The specific implementation of the time window information and how to perform the dynamic control may refer to the processing manner of the UE hereinabove.

The control information herein may further include time window information for indicating a time window position corresponding to each of the ratio limiting parameters. Therefore, the UE may periodically determine the bit rate of the data transmission in the fixed window according to the position of the time window, and then compare the bit rate with the bit rate limiting information, so as to implement the static control of the data transmission. The specific implementation of the time window information and how to perform the static control may refer to the processing manner of the UE hereinabove.

In addition, the data filtering processing of the data flow on the network side may also be controlled at the SDAP layer, so that the amount of data of data packet transmitted to the lower layer entity may be limited.

Figure 2:
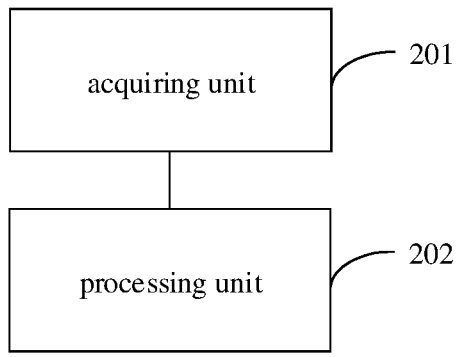
FIG. 2 is a schematic view of a device of controlling a data transmission in some embodiments of the present disclosure.

In a second aspect, a device of controlling a data transmission is provided in some embodiments of the present disclosure. As shown in FIG. 2, the device includes:

an acquiring unit 201, configured to acquire quality of service control information;

a processing unit 202, configured to control a data transmission according to the quality of service control information, and/or transmit the quality of service control information to a user equipment.

Optionally, the quality of service control information includes a bit rate limiting parameter configured to limit a bit rate of the data transmission.

Optionally, the bit rate limiting parameter includes one or more of:

a flow bit rate limiting parameter, a session bit rate limiting parameter, a terminal bit rate limiting parameter and a radio bearer bit rate limiting parameter, where the flow bit rate limiting parameter includes: a flow identifier and a maximum flow bit rate or a guaranteed flow bit rate;

the session bit rate limiting parameter includes: a session identifier and a session aggregate maximum bit rate;

the terminal bit rate limiting parameter includes: a terminal identifier and a terminal aggregate maximum bit rate; and the radio bearer bit rate limiting parameter includes: a radio bearer identifier and a radio bearer maximum bit rate.

Optionally, the bit rate limiting parameter further includes: a bit rate limiting switch indication configured to indicate whether to enable a bit rate limit.

Optionally, the bit rate limiting switch indication is configured to indicate, for each type of the limiting parameter of the bit rate limiting parameter, whether to enable the bit rate limit.

Optionally, the bit rate limiting parameter further includes time window information configured to indicate a time window corresponding to the bit rate limiting parameter.

Optionally, in the case that the bit rate limiting parameter includes the flow bit rate limiting parameter, the time window information includes first time window information configured to indicate a position of the time window corresponding to the flow rate limiting parameter;

in the case that the bit rate limiting parameter includes the session bit rate limiting parameter, the time window information includes second time window information configured to indicate a position of the time window corresponding to the session bit rate limiting parameter;

in the case that the bit rate limiting parameter includes the terminal bit rate limiting parameter, the time window information includes third time window information configured to indicate a position of the time window corresponding to the terminal bit rate limiting parameter;

in the case that the bit rate limiting parameter includes the radio bearer bit rate limiting parameter, the time window information includes fourth time window information configured to indicate a position of the time window corresponding to the radio bearer bit rate limiting parameter.

Optionally, various types of the limiting parameters of the bit rate limiting parameter correspond to the same time window information.

Optionally, the time window information includes at least one of:
a time window starting position, a time window ending position and a time window length.

Optionally, the quality of service control information includes: a flow identifier, a priority of a data flow, a prioritised bit rate of a data flow and a bucket size duration of a data flow.

Optionally, the processing unit 201 is further configured to:
limit the bit rate of the data transmission according to the bit rate limiting parameter.

Optionally, in the case that the bit rate limiting parameter includes the flow identifier and the maximum flow bit rate, the processing unit 201 is further configured to: in the case that a transmission bit rate of a data flow corresponding to the flow identifier reaches the maximum flow bit rate, stop the data transmission of the corresponding data flow;

in the case that the bit rate limiting parameter includes the flow identifier and the guaranteed flow bit rate, the processing unit 201 is further configured to: in the case that a transmission bit rate of a data flow corresponding to the flow identifier reaches the guaranteed flow bit rate, stop the data transmission of the corresponding data flow;

in the case that the bit rate limiting parameter includes the session identifier and the session aggregate maximum bit rate, the processing unit 201 is further configured to: in the case that a transmission bit rate of a session identified by the session identifier reaches the session aggregate maximum bit rate within a preset time window, stop the data transmission of the corresponding session;

in the case that the bit rate limiting parameter includes the terminal identifier and the terminal aggregate maximum bit rate, the processing unit 201 is further configured to: in the case that a transmission bit rate of a terminal identified by the terminal identifier reaches the terminal aggregate maximum bit rate within a preset time window, stop the data transmission of the terminal;

in the case that the bit rate limiting parameter includes the radio bearer identifier and the radio bearer maximum bit rate, the processing unit 201 is further configured to: in the case that a transmission bit rate of a radio bearer identified by the radio bearer identifier reaches the radio bearer maximum bit rate within a preset time window, stop the data transmission of the radio bearer.

Optionally, in the case that the bit rate limiting parameter includes the bit rate limiting switch indication and the bit rate limiting switch indication is configured to indicate, for each type of the limiting parameter of the bit rate limiting parameter, whether to enable the bit rate limit,
the processing unit 201 is further configured to:
in the case that the bit rate limiting switch indication indicates the bit rate limit is enabled, limit the bit rate of the data transmission according to the limiting parameter corresponding to the bit rate limiting switch indication.

Optionally, in the case that the bit rate limiting parameter includes the time window information and the time window information is configured to indicate a length of a time window for calculating a type of bit rate corresponding to each type of the limiting parameters,
the processing unit 201 is further configured to:
determine each time window length indicated by the time window information as the length of the time window corresponding to the corresponding type of bit rate.

Optionally, the processing unit 201 is further configured to:
determine a time position of a last time data transmission as an ending time position of the time window; or
determine a time position of acquiring the bit rate as an ending time position of the time window.

Optionally, in the case that the time window information includes at least one of the first time window information, the second time window information, the third time window information and the fourth time window information,
the processing unit is further configured to:
determine each time window position indicated by the time window information as the position of the time window corresponding to the corresponding type of bit rate.

Optionally, in the case that the time window information includes the ending time position of the time window and the time window length, the processing unit 201 is further configured to:
determine the ending time position of the time window minus the length of the time window and an offset as the time window starting position;

in the case that the time window information includes the staring time position of the time window and the time window length, the processing unit 201 is further configured to:
determine the starting time position of the time window plus the length of the time window and an offset as the time window ending position;

in the case that the time window information includes the staring time position of the time window and the ending time of the time window, the processing unit 201 is further configured to:
acquire, based on the staring time position of the time window and the ending time of the time window, the position of the corresponding time window.

Optionally, a duration of the preset time window is a duration pre-agreed with a network side device.

Optionally, the processing unit 201 is further configured to:
control a transmission of the corresponding data flow at an SDAP layer according to the quality of service control information.

Optionally, the processing unit 201 is further configured to:
allocate corresponding resources for each data flow, in an order from a data flow with a higher priority to a data flow with a lower priority, where for each data flow, an amount of data enabled to be sent since the data flow is started to be established is less than or equal to a maximum data bucket value, the amount of data enabled to be sent is the amount of data enabled to be sent according to the prioritised bit rate of the data flow and from a time point of starting to establish the data flow to a current time point, the maximum data bucket value is a product of the prioritised bit rate and the bucket size duration of the data flow.

Optionally, the processing unit 201 is further configured to:
for the data flows with two adjacent priorities, in the case that the prioritised bit rate of the data flow with the higher priority is an unlimited bit rate, allocate the resources for the data flow with the lower priority after the resources allocated for the data flow with the higher priority are sufficient to transmit all margin data of the data flow with the higher priority.

Optionally, the processing unit 201 is further configured to:
in the case that there are still remained resources after all the data flows are allocated with corresponding resources, allocate the remained resources to the corresponding data flow in an order from the data flow with the higher priority to the data flow with the lower priority.

Optionally, the processing unit 201 is further configured to:
for each data flow, in the case that the amount of data enabled to be sent since the data flow is started to be established is less than or equal to an amount of data sent actually, stop the transmission of the data flow.

Optionally, the processing unit 201 is further configured to:
control the transmission of the data low at an MAC layer according to the quality of service control information.

Optionally, the processing unit 201 is further configured to:
control, according to quality of service control information of the data flows, data flows in the same bearer.

Optionally, the processing unit 201 is further configured to:
receive the quality of service control information sent by a network side device.

According to the embodiments of the present disclosure, the data transmission may be controlled correspondingly. Compared with the prior art, the control process is more direct and simple, and may adapt better the future communication network environment.

The device of controlling the data transmission in this embodiment is a device that is able to perform the method of controlling the data transmission in the embodiment of the present disclosure. Therefore, those skilled in the art is able to perform the method of controlling the data transmission according to the embodiment of the present disclosure.

The specific implementation manner of the device of controlling the data transmission of the present embodiment and various changes thereof are known, so that how the device of controlling the data transmission implements the method of controlling the data transmission in the embodiment of the present disclosure will not be described in detail herein. The device used by the person skilled in the art to implement the method of controlling the data transmission in the embodiment of the present disclosure is within the scope of the present application.

Figure 3:
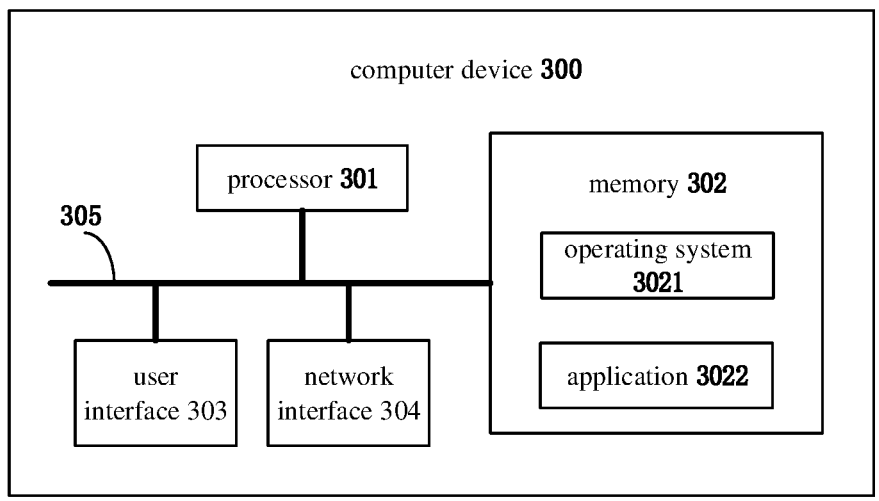
FIG. 3 is a schematic view of a computer device in some embodiments of the present disclosure.

FIG. 3 is a schematic view of a computer device in another embodiment of the present disclosure. The computer device 300 shown in FIG. 3 includes at least one processor 301, a memory 302, at least one network interface 304, and other user interfaces 303. The various components in computer device 300 are coupled together by a bus system 303. It will be appreciated that the bus system 303 is used to implement connection communication between these components. The bus system 303 includes a power bus, a control bus, and a status signal bus in addition to the data bus. However, for clarity of description, various buses are labeled as bus system 303 in FIG. 3.

The user interface 303 may include a display, a keyboard, or a pointing device (e.g., a mouse, a trackball, a touchpad, or a touch screen, etc.).

It is to be understood that the memory 302 in the embodiments of the present disclosure may be a volatile memory or a non-volatile memory, or may include both volatile and non-volatile memory. The non-volatile memory may be a read-only memory (ROM), a programmable read only memory (PROM), an erasable programmable read only memory Erasable PROM (EPROM), or an electric Erase programmable read only memory (EEPROM) or flash memory. The volatile memory can be a Random Access Memory (RAM) that acts as an external cache. By way of example and not limitation, many forms of RAM are available, such as static random access memory (SRAM), dynamic random access memory (DRAM), synchronous dynamic random access memory Synchronous DRAM (SDRAM), Double Data Rate SDRAM (DDRSDRAM), Enhanced Synchronous Dynamic Random Access Memory (ESDRAM), Synchronous Connection Dynamic Random Access Memory (SDRAM) and Direct Memory Bus Random Access Memory (DRRAM). The memory 302 of the systems and methods described herein is intended to comprise, without being limited to, these and any other suitable types of memory.

In some embodiments, the memory 302 stores elements such as executable modules or data structures, or a subset thereof, or their extended set: operating system 3021 and application 3022.

The operating system 3021 includes various system programs, such as a framework layer, a core library layer, a driver layer, and the like, for implementing various basic services and processing hardware-based tasks. The application 3022 includes various applications, such as a media player, a browser, and the like, for implementing various application services. A program implementing the method of the embodiment of the present disclosure may be included in the application 3022.

In the embodiment of the present disclosure, by calling the program or instruction stored in the memory 302, specifically, the program or the instruction stored in the application 3022, the processor 301 is configured to acquire QoS control information, and control a data transmission according to the quality of service control information, and/or transmit the QoS control information to a user equipment.

The method disclosed in the foregoing embodiments of the present disclosure may be applied to the processor 301 or implemented by the processor 301. Processor 301 may be an integrated circuit chip with signal processing capabilities. In the implementation process, each step of the foregoing method may be completed by an integrated logic circuit of hardware in the processor 301 or an instruction in a form of software. The processor 301 may be a general-purpose processor, a digital signal processor (DSP), an application specific integrated circuit (ASIC), a Field Programmable Gate Array (FPGA), or programming logic devices, discrete gates or transistor logic devices, discrete hardware components. The methods, steps, and logical block diagrams disclosed in the embodiments of the present disclosure may be implemented or carried out. The general purpose processor may be a microprocessor or the processor or any conventional processor or the like. The steps of the method disclosed in the embodiments of the present disclosure may be directly implemented by the hardware decoding processor, or may be performed by a combination of hardware and software modules in the decoding processor. The software module may be located in a storage medium in the related art such as random access memory, flash memory, read only memory, programmable read only memory or electrically erasable programmable memory, registers, and the like. The storage medium is located in the memory 302, and the processor 301 reads the information in the memory 302 and performs the steps of the above method in combination with its hardware.

It will be appreciated that the embodiments described herein may be implemented in hardware, software, firmware, middleware, microcode, or a combination thereof. For hardware implementation, the processing unit can be implemented in one or more Application Specific Integrated Circuits (ASICs), Digital Signal Processing (DSP), Digital Signal Processing Equipment DSP Device (DSPD), programmable logic, Programmable Logic Device (PLD), Field-Programmable Gate Array (FPGA), general purpose processor, controller, microcontroller, microprocessor, other electronic unit for performing the functions described herein or a combination thereof.

For a software implementation, the techniques described herein can be implemented by modules (e.g., procedures, functions, and so on) that perform the functions described herein. The software code may be stored in memory and executed by the processor. The memory can be implemented in the processor or external to the processor.

Optionally, the quality of service control information includes a bit rate limiting parameter configured to limit a bit rate of the data transmission.

Optionally, the bit rate limiting parameter includes one or more of:
a flow bit rate limiting parameter, a session bit rate limiting parameter, a terminal bit rate limiting parameter and a radio bearer bit rate limiting parameter, where
the flow bit rate limiting parameter includes: a flow identifier and a maximum flow bit rate or a guaranteed flow bit rate;
the session bit rate limiting parameter includes: a session identifier and a session aggregate maximum bit rate;
the terminal bit rate limiting parameter includes: a terminal identifier and a terminal aggregate maximum bit rate; and the radio bearer bit rate limiting parameter includes: a radio bearer identifier and a radio bearer maximum bit rate.

Optionally, the bit rate limiting parameter further includes: a bit rate limiting switch indication configured to indicate whether to enable a bit rate limit.

Optionally, the bit rate limiting switch indication is configured to indicate, for each type of the limiting parameter of the bit rate limiting parameter, whether to enable the bit rate limit.

Optionally, the bit rate limiting parameter further includes time window information configured to indicate a time window corresponding to the bit rate limiting parameter.

Optionally, in the case that the bit rate limiting parameter includes the flow bit rate limiting parameter, the time window information includes first time window information configured to indicate a position of the time window corresponding to the flow rate limiting parameter;
in the case that the bit rate limiting parameter includes the session bit rate limiting parameter, the time window information includes second time window information configured to indicate a position of the time window corresponding to the session bit rate limiting parameter;
in the case that the bit rate limiting parameter includes the terminal bit rate limiting parameter, the time window information includes third time window information configured to indicate a position of the time window corresponding to the terminal bit rate limiting parameter;
in the case that the bit rate limiting parameter includes the radio bearer bit rate limiting parameter, the time window information includes fourth time window information configured to indicate a position of the time window corresponding to the radio bearer bit rate limiting parameter.

Optionally, various types of the limiting parameters of the bit rate limiting parameter correspond to the same time window information.

Optionally, the time window information includes at least one of:
a time window starting position, a time window ending position and a time window length.

Optionally, the quality of service control information includes: a flow identifier, a priority of a data flow, a prioritised bit rate of a data flow and a bucket size duration of a data flow.

Optionally, the controlling the data transmission according to the quality of service control information includes:
limiting the bit rate of the data transmission according to the bit rate limiting parameter.

Optionally, in the case that the bit rate limiting parameter includes the flow identifier and the maximum flow bit rate, the limiting the bit rate of the data transmission according to the bit rate limiting parameter includes:
in the case that a transmission bit rate of a data flow corresponding to the flow identifier reaches the maximum flow bit rate, stopping the data transmission of the corresponding data flow;
in the case that the bit rate limiting parameter includes the flow identifier and the guaranteed flow bit rate, the limiting the bit rate of the data transmission according to the bit rate limiting parameter includes:
in the case that a transmission bit rate of a data flow corresponding to the flow identifier reaches the guaranteed flow bit rate, stop the data transmission of the corresponding data flow;

in the case that the bit rate limiting parameter includes the session identifier and the session aggregate maximum bit rate, the limiting the bit rate of the data transmission according to the bit rate limiting parameter includes:
in the case that a transmission bit rate of a session identified by the session identifier reaches the session aggregate maximum bit rate within a preset time window, stopping the data transmission of the corresponding session;
in the case that the bit rate limiting parameter includes the terminal identifier and the terminal aggregate maximum bit rate, the limiting the bit rate of the data transmission according to the bit rate limiting parameter includes:
in the case that a transmission bit rate of a terminal identified by the terminal identifier reaches the terminal aggregate maximum bit rate within a preset time window, stopping the data transmission of the terminal;
in the case that the bit rate limiting parameter includes the radio bearer identifier and the radio bearer maximum bit rate, the limiting the bit rate of the data transmission according to the bit rate limiting parameter includes:
in the case that a transmission bit rate of a radio bearer identified by the radio bearer identifier reaches the radio bearer maximum bit rate within a preset time window, stopping the data transmission of the radio bearer.

Optionally, in the case that the bit rate limiting parameter includes the bit rate limiting switch indication and the bit rate limiting switch indication is configured to indicate, for each type of the limiting parameter of the bit rate limiting parameter, whether to enable the bit rate limit,
the limiting the bit rate of the data transmission according to the bit rate limiting parameter includes:
in the case that the bit rate limiting switch indication indicates the bit rate limit is enabled, limiting the bit rate of the data transmission according to the limiting parameter corresponding to the bit rate limiting switch indication.

Optionally, in the case that the bit rate limiting parameter includes the time window information and the time window information is configured to indicate a length of a time window for calculating a type of bit rate corresponding to each type of the limiting parameters,
the processor 301 is further configured to:
determine each time window length indicated by the time window information as the length of the time window corresponding to the corresponding type of bit rate.

Optionally, the processing unit 301 is further configured to:
determine a time position of a last time data transmission as an ending time position of the time window; or
determine a time position of acquiring the bit rate as an ending time position of the time window.

Optionally, in the case that the time window information includes at least one of the first time window information, the second time window information, the third time window information and the fourth time window information,
the processor 301 is further configured to:
determine each time window position indicated by the time window information as the position of the time window corresponding to the corresponding type of bit rate.

Optionally, in the case that the time window information includes the ending time position of the time window and the time window length, the processor 301 is further configured to:
determine the ending time position of the time window minus the length of the time window and an offset as the time window starting position;
in the case that the time window information includes the staring time position of the time window and the time window length, the processor 301 is further configured to:
determine the starting time position of the time window plus the length of the time window and an offset as the time window ending position;
in the case that the time window information includes the staring time position of the time window and the ending time of the time window, the processor 301 is further configured to:
acquire, based on the staring time position of the time window and the ending time of the time window, the position of the corresponding time window.

Optionally, a duration of the preset time window is a duration pre-agreed with a network side device.

Optionally, the limiting the bit rate of the data transmission according to the bit rate limiting parameter includes:
controlling a transmission of the corresponding data flow at an SDAP layer according to the quality of service control information.

Optionally, the limiting the bit rate of the data transmission according to the bit rate limiting parameter includes:
allocating corresponding resources for each data flow, in an order from a data flow with a higher priority to a data flow with a lower priority, where for each data flow, an amount of data enabled to be sent since the data flow is started to be established is less than or equal to a maximum data bucket value, the amount of data enabled to be sent is the amount of data enabled to be sent according to the prioritised bit rate of the data flow and from a time point of starting to establish the data flow to a current time point, the maximum data bucket value is a product of the prioritised bit rate and the bucket size duration of the data flow.

Optionally, allocating the corresponding resources for each data flow in the order from a data flow with a higher priority to a data flow with a lower priority includes:
for the data flows with two adjacent priorities, in the case that the prioritised bit rate of the data flow with the higher priority is an unlimited bit rate, allocating the resources for the data flow with the lower priority after the resources allocated for the data flow with the higher priority are sufficient to transmit all margin data of the data flow with the higher priority.

Optionally, the controlling the data transmission according to the QoS control information includes:
in the case that there are still remained resources after all the data flows are allocated with corresponding resources, allocating the remained resources to the corresponding data flow in an order from the data flow with the higher priority to the data flow with the lower priority.

Optionally, the allocating the corresponding resources for each data flow in the order from the data flow with the higher priority to the data flow with the lower priority includes:
for each data flow, in the case that the amount of data enabled to be sent since the data flow is started to be established is less than or equal to an amount of data sent actually, stopping the transmission of the data flow.

Optionally, the controlling the data transmission according to the QoS control information includes:

controlling the transmission of the data low at an MAC layer according to the quality of service control information.

Optionally, the controlling the data transmission according to the QoS control information includes:

controlling, according to quality of service control information of the data flows, data flows in the same bearer.

Optionally, the acquiring the quality of service control information includes:

receiving the quality of service control information sent by a network side device.

The computer device 300 is able to implement various processes implemented by the network side device in the foregoing embodiment. To avoid repetition, details are not described herein again.

According to the embodiments of the present disclosure, the data transmission may be controlled correspondingly. Compared with the prior art, the control process is more direct and simple, and may adapt better the future communication network environment.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods for implementing the described functions for each particular application, but such implementation should not be considered to be beyond the scope of the present disclosure.

A person skilled in the art can clearly understand that for the convenience and brevity of the description, the specific working process of the system, the device and the unit described above can refer to the corresponding process in the foregoing method embodiment, and details are not described herein again.

In the embodiments provided by the present application, it should be understood that the disclosed apparatus and method may be implemented in other manners. For example, the device embodiments described above are merely illustrative. For example, the division of the unit is only a logical function division. In actual implementation, there may be another division manner, for example, multiple units or components may be combined or can be integrated into another system, or some features can be ignored or not executed. In addition, the mutual coupling or direct coupling or communication connection shown or discussed may be an indirect coupling or communication connection through some interface, device or unit, and may be in an electrical, mechanical or other form.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

In addition, each functional unit in each embodiment of the present disclosure may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution of the present disclosure, which is essential or contributes to the prior art, or a part of the technical solution, may be embodied in the form of a software product, which is stored in a storage medium, including The instructions are used to cause a computer device (either a personal computer, a server, or a network device, etc.) to perform all or part of the steps of the methods described in various embodiments of the present disclosure. The foregoing storage medium includes various media that can store program codes, such as a USB flash drive, a mobile hard disk, a ROM, a RAM, a magnetic disk, or an optical disk.

The above are only some embodiments of the present disclosure, and it should be noted that those skilled in the art may also make several improvements and refinements without departing from the principles of the present disclosure, which should be considered as the scope of the present disclosure.

What is claimed is:

1. A method of controlling a data transmission, comprising:

acquiring quality of service control information;

controlling a data transmission according to the quality of service control information;

wherein the quality of service control information comprises a bit rate limiting parameter configured to limit a bit rate of the data transmission;

wherein the controlling the data transmission according to the quality of service control information comprises: limiting the bit rate of the data transmission according to the bit rate limiting parameter;

wherein in the case that the bit rate limiting parameter comprises the bit rate limiting switch indication and the bit rate limiting switch indication is configured to indicate, for each type of the limiting parameter of the bit rate limiting parameter, whether to enable the bit rate limit, the limiting the bit rate of the data transmission according to the bit rate limiting parameter comprises: in the case that the bit rate limiting switch indication indicates the bit rate limit is enabled, limiting the bit rate of the data transmission according to the limiting parameter corresponding to the bit rate limiting switch indication;

wherein the bit rate limiting parameter comprises a radio bearer bit rate limiting parameter, wherein the radio bearer bit rate limiting parameter comprises: a radio bearer identifier and a radio bearer maximum bit rate;

the limiting the bit rate of the data transmission according to the bit rate limiting parameter comprises:

in the case that a transmission bit rate of a radio bearer identified by the radio bearer identifier reaches the radio bearer maximum bit rate within a preset time window, stopping the data transmission of the radio bearer;

wherein the bit rate limiting parameter further comprises time window information configured to indicate a time window corresponding to the bit rate limiting parameter, wherein in the case that the bit rate limiting parameter comprises the radio bearer bit rate limiting parameter, the time window information comprises fourth time window information configured to indicate a position of the time window corresponding to the radio bearer bit rate limiting parameter;

wherein the method further comprises:

determining a time position of acquiring the bit rate as a starting time position of the time window;

wherein the quality of service control information further comprises: a flow identifier, a priority of a data flow, a prioritized bit rate of a data flow and a bucket size duration of a data flow;

wherein the controlling the data transmission according to the quality of service control information comprises:

allocating corresponding resources for each data flow, in an order from a data flow with a higher priority to a data flow with a lower priority, wherein for each data flow, an amount of data enabled to be sent since the data flow is started to be established is less than or equal to a maximum data bucket value, the amount of data enabled to be sent is the amount of data enabled to be sent according to the prioritized bit rate of the data flow and from a time when starting to establish the data flow to a current time point, the maximum data bucket value is a product of the prioritized bit rate and the bucket size duration of the data flow;

wherein the allocating the corresponding resources for each data flow in the order from a data flow with a higher priority to a data flow with a lower priority comprises:

for the data flows with two adjacent priorities, in the case that the prioritized bit rate of the data flow with the higher priority is an unlimited bit rate, allocating the resources for the data flow with the lower priority after the resources allocated for the data flow with the higher priority are sufficient to transmit all margin data of the data flow with the higher priority;

or for each data flow, in the case that the amount of data enabled to be sent since the data flow is started to be established is less than or equal to an amount of data sent actually, stopping the transmission of the data flow.

2. The method according to claim 1, wherein the bit rate limiting parameter further comprises a flow bit rate limiting parameter, wherein the flow bit rate limiting parameter comprises: a flow identifier and a maximum flow bit rate or a guaranteed flow bit rate.

3. The method according to claim 2, wherein in the case that the bit rate limiting parameter comprises the flow bit rate limiting parameter, the time window information comprises first time window information configured to indicate a position of the time window corresponding to the flow rate limiting parameter;

in the case that the bit rate limiting parameter comprises a session bit rate limiting parameter, the time window information comprises second time window information configured to indicate a position of the time window corresponding to the session bit rate limiting parameter;

in the case that the bit rate limiting parameter comprises a terminal bit rate limiting parameter, the time window information comprises third time window information configured to indicate a position of the time window corresponding to the terminal bit rate limiting parameter.

4. The method according to claim 1, wherein in the case that the bit rate limiting parameter comprises the flow identifier and a maximum flow bit rate, the limiting the bit rate of the data transmission according to the bit rate limiting parameter comprises:

in the case that a transmission bit rate of a data flow corresponding to the flow identifier reaches the maximum flow bit rate, stopping the data transmission of the corresponding data flow;

in the case that the bit rate limiting parameter comprises the flow identifier and a guaranteed flow bit rate, the limiting the bit rate of the data transmission according to the bit rate limiting parameter comprises:

in the case that a transmission bit rate of a data flow corresponding to the flow identifier reaches the guaranteed flow bit rate, stopping the data transmission of the corresponding data flow;

in the case that the bit rate limiting parameter comprises a session identifier and a session aggregate maximum bit rate, the limiting the bit rate of the data transmission according to the bit rate limiting parameter comprises:

in the case that a transmission bit rate of a session identified by the session identifier reaches the session aggregate maximum bit rate within a preset time window, stopping the data transmission of the corresponding session;

in the case that the bit rate limiting parameter comprises a terminal identifier and a terminal aggregate maximum bit rate, the limiting the bit rate of the data transmission according to the bit rate limiting parameter comprises:

in the case that a transmission bit rate of a terminal identified by the terminal identifier reaches the terminal aggregate maximum bit rate within a preset time window, stopping the data transmission of the terminal.

5. A device of controlling a data transmission, comprising: a processor, a memory and a network access program stored in the memory and executable by the processor, wherein the network access program is executed by the processor to:

acquire quality of service control information;

control a data transmission according to the quality of service control information;

wherein the quality of service control information comprises a bit rate limiting parameter configured to limit a bit rate of the data transmission;

wherein the network access program is executed by the processor to limit the bit rate of the data transmission according to the bit rate limiting parameter;

wherein in the case that the bit rate limiting parameter comprises the bit rate limiting switch indication and the bit rate limiting switch indication is configured to indicate, for each type of the limiting parameter of the bit rate limiting parameter, whether to enable the bit rate limit, wherein the network access program is executed by the processor to: in the case that the bit rate limiting switch indication indicates the bit rate limit is enabled, limit the bit rate of the data transmission according to the limiting parameter corresponding to the bit rate limiting switch indication;

wherein the bit rate limiting parameter comprises a radio bearer bit rate limiting parameter, wherein the radio bearer bit rate limiting parameter comprises: a radio bearer identifier and a radio bearer maximum bit rate;

the network access program is executed by the processor to:

in the case that a transmission bit rate of a radio bearer identified by the radio bearer identifier reaches the radio bearer maximum bit rate within a preset time window, stop the data transmission of the radio bearer;

wherein the bit rate limiting parameter further comprises time window information configured to indicate a time window corresponding to the bit rate limiting parameter, wherein in the case that the bit rate limiting parameter comprises the radio bearer bit rate limiting parameter, the time window information comprises fourth time window information configured to indicate a position of the time window corresponding to the radio bearer bit rate limiting parameter;

wherein the network access program is executed by the processor to:

determine a time position of acquiring the bit rate as a starting time position of the time window;

wherein the quality of service control information further comprises: a flow identifier, a priority of a data flow, a prioritized bit rate of a data flow and a bucket size duration of a data flow:

wherein the network access program is executed by the processor to:

allocate corresponding resources for each data flow, in an order from a data flow with a higher priority to a data flow with a lower priority, wherein for each data flow, an amount of data enabled to be sent since the data flow is started to be established is less than or equal to a maximum data bucket value, the amount of data enabled to be sent is the amount of data enabled to be sent according to the prioritized bit rate of the data flow and from a time when starting to establish the data flow to a current time point, the maximum data bucket value is a product of the prioritized bit rate and the bucket size duration of the data flow;

wherein the network access program is executed by the processor to:

for the data flows with two adjacent priorities, in the case that the prioritized bit rate of the data flow with the higher priority is an unlimited bit rate, allocate the resources for the data flow with the lower priority after the resources allocated for the data flow with the higher priority are sufficient to transmit all margin data of the data flow with the higher priority;

or for each data flow, in the case that the amount of data enabled to be sent since the data flow is started to be established is less than or equal to an amount of data sent actually, stop the transmission of the data flow.

6. The device according to claim 5, wherein the bit rate limiting parameter further comprises a flow bit rate limiting parameter, wherein the flow bit rate limiting parameter comprises: a flow identifier and a maximum flow bit rate or a guaranteed flow bit rate.

7. The device according to claim 6, wherein in the case that the bit rate limiting parameter comprises the flow bit rate limiting parameter, the time window information comprises first time window information configured to indicate a position of the time window corresponding to the flow rate limiting parameter;

in the case that the bit rate limiting parameter comprises a session bit rate limiting parameter, the time window information comprises second time window information configured to indicate a position of the time window corresponding to the session bit rate limiting parameter;

in the case that the bit rate limiting parameter comprises a terminal bit rate limiting parameter, the time window information comprises third time window information configured to indicate a position of the time window corresponding to the terminal bit rate limiting parameter.

8. The device according to claim 5, wherein in the case that the bit rate limiting parameter comprises the flow identifier and a maximum flow bit rate, the network access program is executed by the processor to:

in the case that a transmission bit rate of a data flow corresponding to the flow identifier reaches the maximum flow bit rate, stop the data transmission of the corresponding data flow;

in the case that the bit rate limiting parameter comprises the flow identifier and a guaranteed flow bit rate, the network access program is executed by the processor to:

in the case that a transmission bit rate of a data flow corresponding to the flow identifier reaches the guaranteed flow bit rate, stop the data transmission of the corresponding data flow;

in the case that the bit rate limiting parameter comprises a session identifier and a session aggregate maximum bit rate, the network access program is executed by the processor to:

in the case that a transmission bit rate of a session identified by the session identifier reaches the session aggregate maximum bit rate within a preset time window, stop the data transmission of the corresponding session;

in the case that the bit rate limiting parameter comprises a terminal identifier and a terminal aggregate maximum bit rate, the network access program is executed by the processor to:

in the case that a transmission bit rate of a terminal identified by the terminal identifier reaches the terminal aggregate maximum bit rate within a preset time window, stop the data transmission of the terminal.

\* \* \* \* \*